Figure 1:
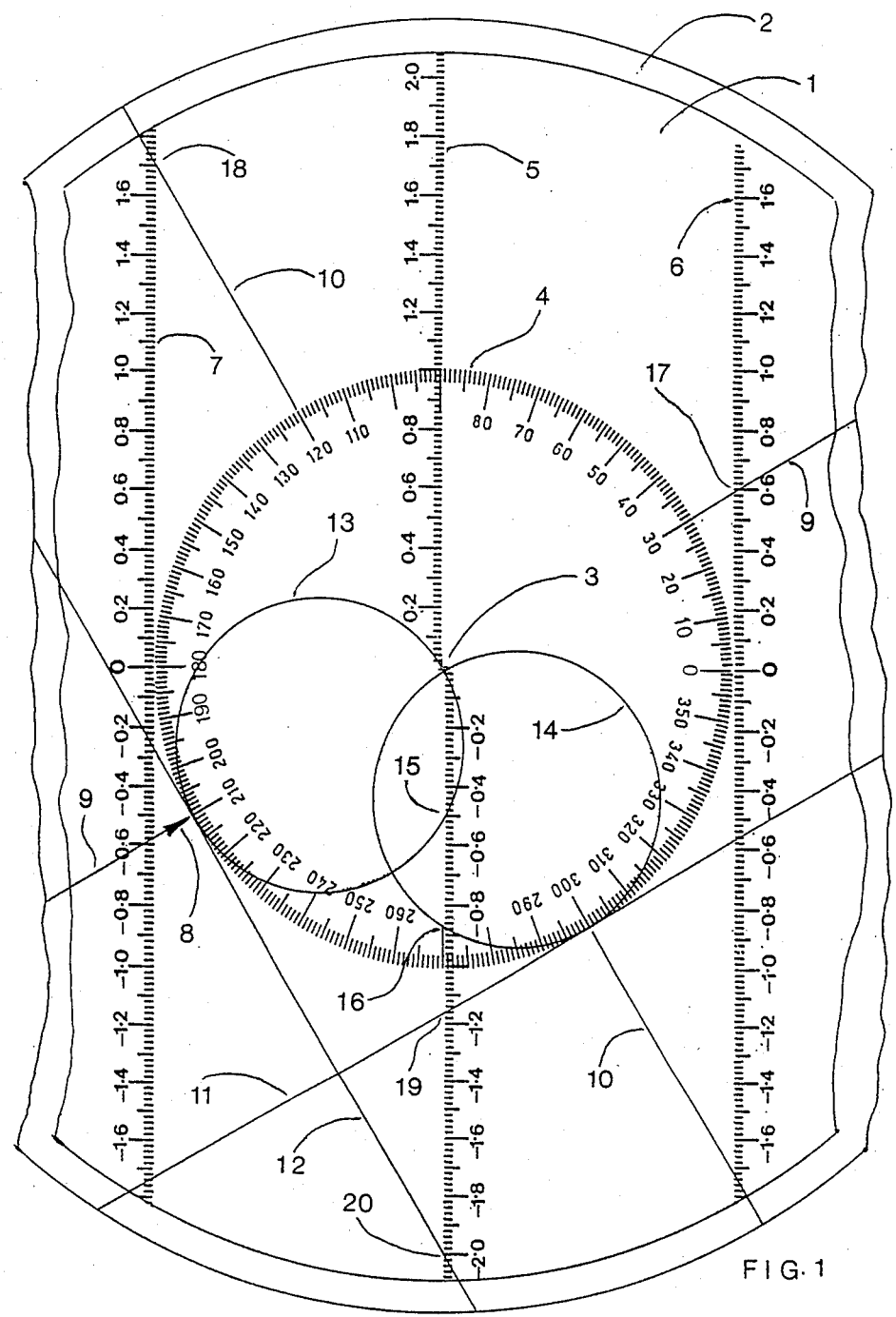

United States Patent [19]

Djali

[11] Patent Number: 4,655,714

[45] Date of Patent: Apr. 7, 1987

[54] VISUAL AID FOR TEACHING TRIGONOMETRIC FUNCTIONS

[76] Inventor: Reza Djali, 177, Mount Pleasant, Kingswinford, West Midlands, England, DY6 9SS

[21] Appl. No.: 720,149

[22] Filed: Apr. 4, 1985

[51] Int. Cl.$^4$ ............................................. G09B 23/04
[52] U.S. Cl. .............................. 434/211; 235/61 GM
[58] Field of Search ............... 434/211, 191, 188, 215, 434/216; 235/61 GM

[56] References Cited

U.S. PATENT DOCUMENTS

| | | | |
|---|---|---|---|
| 1,955,392 | 4/1934 | Shimberg | 434/215 X |
| 2,521,930 | 9/1950 | McPartlin | 434/215 |
| 3,556,397 | 1/1971 | Anderson | 235/61 GM |
| 3,610,519 | 10/1971 | Radosavljevic | 434/211 X |
| 3,826,021 | 7/1974 | De Andrea | 434/215 |
| 3,827,163 | 8/1974 | Grimes | 434/215 |
| 4,435,162 | 3/1984 | Schoenwald | 434/215 |

Primary Examiner—William H. Grieb

[57] ABSTRACT

A planar member 21, is pivotally assembled to a transparent planar member 22, at pivot point 23. On the planar member 21, are the calibrated circle 24, the cosine/secant scale 25, and the sine/cosecant scale 26.

On the transparent member 22, are the sine/cosine cursor circle 27, the tangent/cotangent scale 28, and the arrow head 29.

For any relative position of the two members, the arrow head 29, points to an angle. Each of the six trigonometric functions of that angle is read where the appropriate scale is intersected by another line.

Figure 2:
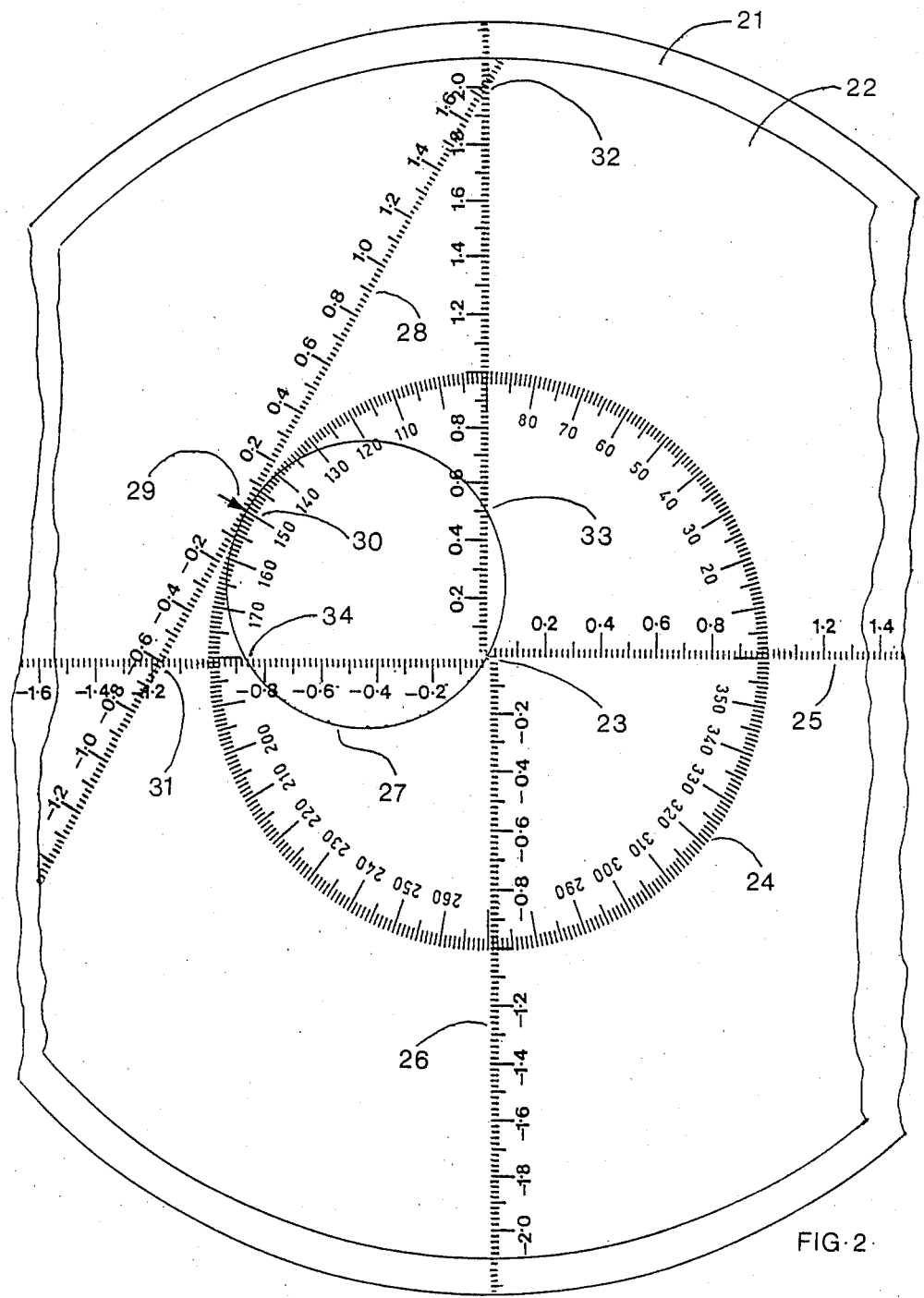

FIG. 2, shows the device set at 150 degrees as an example. The sine and the cosine of 150 degrees are read at intersections 33 and 34 respectively. The secant and the tangent at intersection 31. The cosecant and cotangent at 32. The sign of any cotangent reading needs to be reversed.

9 Claims, 3 Drawing Figures

VISUAL AID FOR TEACHING TRIGONOMETRIC FUNCTIONS

This invention is a visual aid for teaching of sines, cosines, tangents, cotangents, secants and cosecants collectively known as trigonometric functions.

At an elementary level, these functions are defined as the ratios of sides of right angled triangles. However, for angles above 90 degrees this type of definition becomes inadequate and more comprehensive definitions are used. Many students experience difficulty in understanding the comprehensive definitions without a simulator or a mathematical model. The models at present available use either very complicated reciprocating slide mechanisms, or non uniform calibrations of scales, or limitation of range to 90 degrees, or simulation confined to a few of the six functions.

Electronic Calculators compute the values of the trigonometric functions without providing visual simulation. Other aids use a single cursor line to read several calibrated scales simultaneously. These are in fact circular slide rules where the calibrations are modulated to give the correct answer. The non uniform calibrations obscure the underlying geometry. Some models use a very similar principle to show the correct values through a set of simultaneously movable windows. U.S. Pat. No. 3,827,163 provides genuine simulation for all the six main functions by a complex involving two reciprocating slide mechanisms and one pivoted joint. U.S. Pat. No. 3,556,397 is confined to sines, cosines and tangents. In U.S. Pat. No. 3,826,021 the angular movement is limited to 90 degrees. The device employs three sliders in curved tracks and two pivoted joints. U.S. Pat. No. 4,435,162 provides an excellent simulator for sines and cosines in a device involving only one pivoted joint. On one member a pair of mutually perpendicular scales represent two chosen functions. On the other member the periphery of a plane geometric shape is used as the common cursor line for the two scales. The device is thereby limited to demonstrating only two functions on any one embodiment. Further more the two functions must be an isomorphic pair such as Sin, Cos; $Sin^2$, $Cos^2$; $Sin^2+Cos$, $Cos^2+Sin$. Their range must be identical, for example from $-1$ to $+1$ for Sine and Cosine or from 0 to $+1$ for $Sin^2$ and $Cos^2$. The patent shows that for Sin and Cos the required geometric shape is a circle and for $Sin^2$ and $Cos^2$, the shape is a lemniscate. Using the periphery of a plane geometric shape as the cursor line limits the choice of functions to those with a finite range.

Tangents, Cotangents, Secants and Cosecants have an infinite range. For these functions there is no geometric shape with a periphery in the true sense.

The invention provides an exceptionally simple trigonometric teaching device that employs just one pivoted joint and achieves true visual simulation of all six trigonometric functions on uniformly calibrated rectilinear scales. Hitherto, this level of visual simulation has been achieved only by devices involving much more complex mechanisms such as Grimes U.S. Pat. No. 3,827,163. The absence of complicated moving parts allows a clearer visual perception of how the functions relate to the angle and to each other. The commercial advantages of a simple design are low cost and durability.

The invention in its simplest form has a scale member pivotally assembled to a transparent cursor member. The scale features uniformly calibrated scales for angles and the six trigonometric functions. The cursor member features the cursor lines for the angle and the six trigonometric functions. The relative pivotal movement between the two members causes the set of seven cursor lines to move simultaneously along the seven corresponding calibrated scales. In an alternative embodiment of the invention, the distinction between the scale member and the cursor member is removed, each member featuring some of the calibrated scales and some of the cursor lines.

According to the invention the calibrated scales for sines, cosines, secants and cosecants as well as the cursor lines for tangents and cotangents are all rectilinear and pass through the pivot point. These six straight lines may be merged in various combinations to few than six. The calibrated scales for tangents and cotangents as well as the cursor lines for sectants and cosecants are rectilinear and their perpendicular distances from the pivot point is one unit. These four straight lines may be merged in various combinations to fewer than four. The cursor lines for sines and cosines are circles, so positioned that one point on the circumference of each circle coincides with the pivot point. Each of these two circles has a diameter of one unit. These two circles may be preferably merged into one. The angle scale is a calibrated circle concentric with the pivot point. The cursor line for angles is radial, directed at the pivot point, preferably featuring an arrow head. The stated features may be printed on the members or be produced by other means such as narrow slots in circular or rectilinear form, boundaries between contrasting colours or contrasting shades, circular or rectilinear edges of artifacts, circular holes and the like.

Figure 3:
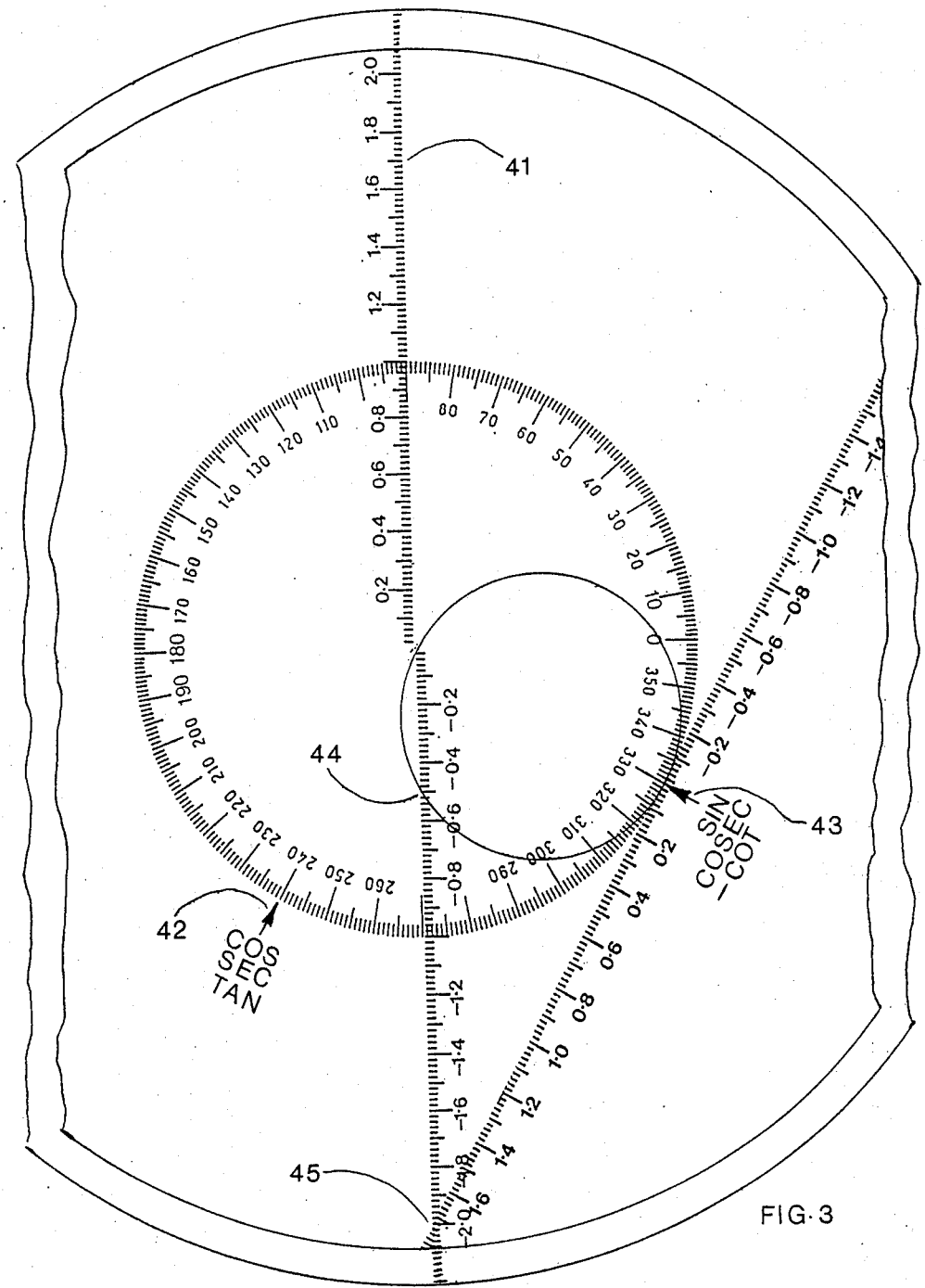

Three embodiments of the invention will now be described with the aid of the accompanying drawings in which FIGS. 1, 2 and 3 show the first, the second and the third embodiments respectively.

In FIG. 1, the scale member 1 is pivotally assembled to the transparent cursor member 2 at the pivot point 3. On the scale member 1 are imprinted the calibrated circle 4 and the rectilinear scales 5, 6 and 7. On the cursor member 2 are imprinted the arrow head 8 and the straight lines 9, 10, 11 and 12 and the circles 13 and 14. The circle 4 is the scale for angles. The calibrated scale 5 is the combined scale for sines, cosines, secants and cosecants. The scales 6 and 7 are for tangents and cotangents respectively. The arrow head 8 is the angle indicator. The lines 9, 10, 11 and 12 are the cursor lines for tangents, cotangents, secants and cosecants respectively. The circles 13 and 14 are the cursor lines for sines and cosines respectively. By way of example, the device is shown with the arrow head pointing at 210 degrees. The sine, cosine, tangent, cotangent, secant and cosecant of 210 degrees are read at the intersections 15, 16, 17, 18, 19 and 20.

In FIG. 2 a planar member 21 is pivotally assembled to another planar member 22, at the pivot point 23. The calibrated circle 24 and the rectilinear scales 25 and 26 are imprinted on the planar member 21. The circle 24 is the angle scale. The radius of this circle is taken as one unit for calibrating the rest of the device. The straight line 25 is the combined cosine scale, secant scale and the tangent cursor line. The line 25 is calibrated from negative to positive values and positioned, as shown with its zero mark coinciding with the pivot point. The straight line 26 is the combined sine scale, cosecant scale and the cotangent cursor line. The line 26 is perpendicular to the line 25 and similarly calibrated and positioned with its zero mark coinciding with the pivot point. The circle 27, the line 28, and the arrow head 29 are imprinted on the planar member 22. The circle 27 is the combined sine and cosine cursor line. The diameter of the circle 27 is one unit. One point of the circumference of the circle 27 coincides with the pivot point 23. The straight line 28 is then combined tangent scale, the secant cursor line and the cosecant cursor line. The line 28 is tangential to the circle 27 at a point 30, diametrically opposed to the pivot point 23. The line 28 is calibrated from negative to positive values. To minimize the number of lines, the line 28 is also used as the cotangent scale simply by reversing the sign. The angle indicator is the arrow head 29 directed at the pivot point 23 and placed at the point 30. By way of example the device is shown set at 150 degrees. The tangent, cotangent, sine, cosine, secant and cosecant of 150 degrees are read respectively at intersections 31, 32, 33, 34, 31 and 32 on the appropriate scales.

The third embodiment of the invention is shown in FIG. 3. The construction is similar to the second embodiment and the number of rectilinear scales are reduced from three to two. The line 41 is the combined scale for sines, cosines, secants and cosecants. The words COS, SEC and TAN are imprinted near the arrow head 42, indicating that this arrow head is brought to point at the desired angle to find the cosine, the secant or the tangent. The words SIN, COSEC and —COT are imprinted near the arrow head 43 indicating that this arrow head is similarly used for sine, cosecant and cotangent. The negative sign before COT indicates that the sign of any cotangent reading should be reversed.

By way of example, the device is shown set to read the cosine, the secant and the tangent of 240 degrees and the sine, the cosecant and cotangent of 330 degrees at the intersections 44 and 45 on the appropriate scales.

A further application of this embodiment is demonstration of the identities COS $x$=Sin $(x+90)$; Sec $x$=Cosec $(x+90)$; Tan $x$=−COT $(x+90)$.

The three embodiments described are but examples of the multitude of other arrangements of scales and cursor lines according to the invention.

In an alternative embodiment, for optical projection both members may be wholly or in part transparent.

The invention may also be embodied in an adaption to enable the trigonometric functions to be studied separately or jointly as desired. In such an embodiment the scale mameber is made up of layers of superimposed transparent material, each layer showing some of the scales. Correspondingly the cursor member is made up of layers of superimposed transparent material, each showing some of the cursor lines. The device is then operated with desired selection of layers.

I claim:

1. A trigonometric device wherein two planar members are pivotally assembled, the relative rotational movement of said two members enabling simulation of angles, one said member featuring rectilinear scales for secants and cosecants, said two scales being mutually perpendicular, each scale being uniformly calibrated and colinear with the pivot point, the other said member featuring
a straight line as the combined cursor for secants and cosecants, the perpendicular distance of said straight line from the pivot point being equal to one unit of calibration of said rectilinear scales.

2. A device according to claim 1 wherein said mutually perpendicular scales also act as the scales for sines and cosines.

3. A trigonometric device wherein two planar members are pivotally assembled, the relative rotational movement of said two members enabling simulation of angles, one said member featuring rectilinear scales for tangents and cotangents, said two scales being uniformly calibrated and mutually parallel, the other said member featuring two cursor lines co-operating with said scales, said cursor lines being mutually perpendicular and colinear with the pivot point.

4. A trigonometric device wherein two planar members are pivotally assembled, the relative pivotal movement of said members enabling simulation of angles, one said member featuring a uniformly calibrated rectilinear scale as the combined scale for tangents and cotangents, the other said member featuring two rectilinear cursors for tangents and cotangents, said cursors being mutually perpendicular and colinear with the pivot point.

5. A trigonometric device wherein two planar members are pivotally assembled, the relative rotational movement of said two members enabling simulation of angles, one said member featuring a rectilinear scale as the combined scale for sines and cosines, said scale being uniformly calibrated, the zero mark of said scale coinciding with the pivot point, the cursors co-operating with said scale appearing on the other said member, said cursors being rectilinear for secants and cosecants; and circular for sines and cosines.

6. A device according to claim 5 wherein said scale also acts as the scale for secants and cosecants.

7. A trigonometric device wherein two planar members are pivotally assembled, each trigonometric function on said device having a scale featured on one said member and a cursor co-operating with said scale featured on the other said member, the scale for angles being a calibrated circle concentric with the pivot point featured on one said member, said calibrated circle co-operating with a plurality of radial markers, such as arrowheads featured on the other said member, each said marker being assigned to be used for a specific selection of the trigonometric functions when operating the device.

8. A trigonometric device wherein two pivotally assembled members collectively feature the scales and cursors for all six trigonometric functions, all said scales being rectilinear and uniformly calibrated, and for each said function, the scale being on one said member, and the cursor for that function being on the other of said two members, the relative rotational movement of said two members enabling simulation of angles and causing simultaneous movement of all cursors relative to said scales, each scale being read directly at its point of intersection with the corresponding cursor.

9. A device according to any one of the claims 1 to 8, wherein the scale for one function acts as the cursor for a different function.

* * * * *